(12) United States Patent
Seille

(10) Patent No.: US 9,108,532 B2
(45) Date of Patent: Aug. 18, 2015

(54) SLIDE RAIL FOR AN AUTOMOTIVE VEHICLE SEAT WITH LATERAL LOCKING WITHOUT CLEARANCE

(75) Inventor: Sébastien Seille, Flers (FR)

(73) Assignee: Faurecia Sièges d'Automobile, Nanterre (FR)

(*) Notice: Subject to any disclaimer, the term of this patent is extended or adjusted under 35 U.S.C. 154(b) by 633 days.

(21) Appl. No.: 13/193,232

(22) Filed: Jul. 28, 2011

(65) Prior Publication Data

US 2012/0032059 A1 Feb. 9, 2012

(30) Foreign Application Priority Data

Aug. 4, 2010 (FR) .................................... 10 56444

(51) Int. Cl.
*F16M 13/00* (2006.01)
*B60N 2/07* (2006.01)
*B60N 2/08* (2006.01)

(52) U.S. Cl.
CPC ............ *B60N 2/0705* (2013.01); *B60N 2/0818* (2013.01); *B60N 2/0843* (2013.01); *B60N 2/0868* (2013.01); *B60N 2205/20* (2013.01)

(58) Field of Classification Search
CPC ...... B60N 2/08; B60N 2/0818; B60N 2/0837; B60N 2/0843; B60N 2205/20
USPC ............ 248/424, 429, 430, 298.1; 297/344.1, 297/344.11; 296/65.01, 65.11, 65.13, 296/65.14, 65.15
See application file for complete search history.

(56) References Cited

U.S. PATENT DOCUMENTS

| 6,641,104 | B2 | 11/2003 | Flick |
| 6,648,292 | B2 | 11/2003 | Flick et al. |
| 7,523,913 | B2 * | 4/2009 | Mizuno et al. ................. 248/429 |
| 7,735,798 | B2 * | 6/2010 | Kojima .......................... 248/429 |
| 7,758,008 | B2 * | 7/2010 | Kojima et al. ................. 248/430 |
| 7,780,138 | B1 * | 8/2010 | Lee et al. ........................ 248/429 |
| 2007/0069098 | A1 * | 3/2007 | Kojima .......................... 248/429 |
| 2010/0133407 | A1 * | 6/2010 | Fujieda et al. ................. 248/429 |
| 2010/0181460 | A1 * | 7/2010 | Park et al. ...................... 248/429 |

FOREIGN PATENT DOCUMENTS

| DE | 10041605 C1 | 1/2002 |
| DE | 102005003032 A1 | 3/2006 |
| EP | 2141045 A1 | 3/2008 |

(Continued)

OTHER PUBLICATIONS

French Search Report from related French Application No. FR 10 56444; report dated Mar. 15, 2011.

*Primary Examiner* — Christopher Garft
(74) *Attorney, Agent, or Firm* — Miller, Matthias & Hull LLP

(57) ABSTRACT

A slide rail for an automotive vehicle seat comprising a first profile, a second profile and a lock, in which:
the lock is movably mounted between an unlocked position and a locked position,
the lock has a first series of teeth and a second series of teeth, remote from one another in an upright direction,
the first series of teeth has a first stop surface and a second stop surface, opposing one another, coming into contact with the first profile to immobilize the lock relative to the first profile along a longitudinal direction, and
the second series of teeth has a first stop surface and a second stop surface, opposing one another, coming into contact with a second profile to immobilize the lock relative to the second profile along the longitudinal direction.

13 Claims, 12 Drawing Sheets

(56) References Cited

FOREIGN PATENT DOCUMENTS

| | | | |
|---|---|---|---|
| FR | 2908698 A1 | 5/2008 |
| WO | WO-2008/093918 A1 | 8/2008 |
| WO | WO-2009/004820 A1 | 4/2009 |
| WO | WO-2009/128848 A1 | 10/2009 |

* cited by examiner

SLIDE RAIL FOR AN AUTOMOTIVE VEHICLE SEAT WITH LATERAL LOCKING WITHOUT CLEARANCE

CROSS-REFERENCE TO RELATED APPLICATIONS

This application claims priority under the Paris Convention to the French Patent Application No. 10 56444, filed on Aug. 4, 2010.

FIELD OF THE DISCLOSURE

The invention relates to a slide rail for an automotive vehicle seat and an assembly comprising the slide rail.

Such a slide rail is generally designed to be arranged in pairs between a vehicle floor and a seat pan to adjust the position of the seat.

BACKGROUND OF THE DISCLOSURE

The document DE-10 2005 003 032 discloses a slide rail comprising a first profile, a second profile and a lock. The lock is movably mounted on the second profile between an unlocked position and a locked position, in the unlocked position the lock permitting relative sliding between the first profile and the second profile along a longitudinal direction, and in the locked position the lock preventing said relative sliding. The lock has a first series of teeth and a second series of teeth, the teeth of the first series and the second series each extending in a transversal direction perpendicular to the longitudinal direction and the first series of teeth is remote from the second series of teeth in an upright direction perpendicular to the longitudinal direction and the transversal direction.

By "series of teeth" should be understood a succession of teeth arranged consecutively, the series comprising a non-zero number of teeth, which may be equal to 1.

SUMMARY OF THE DISCLOSURE

The object of the invention is to improve the safety in the event of an impact and the comfort of the occupant of the seat, without substantially increasing the cost of the slide rail. To achieve this, according to the invention, the slide rail has the following features:

the first series of teeth has a first stop surface and a second stop surface opposing one another, respectively coming into contact with a first abutment surface and a second abutment surface of the first profile, in the locked position, to immobilize the lock in translation relative to the first profile along the longitudinal direction, the second series of teeth has a first stop surface and a second stop surface, opposing one another, respectively coming into contact with a first abutment surface and a second abutment surface of the second profile, in the locked position, to immobilize the lock in translation relative to the second profile in the longitudinal direction.

Thus, in the locked position, the first profile and the second profile are held without clearance relative to one another. The first series of teeth locks together the first profile and the second profile, in particular to absorb the forces in the event of an impact, whilst the second series of teeth takes up the clearance between the lock and the second profile. As a result, the user has the sensation of being held without any clearance being present and the displacement of the occupant in the event of an impact is reduced. Moreover, as the lock opposes a relative displacement from the start, whilst it opposes it with a delay where there is relative clearance, the relative speed is reduced which increases the resistance of the slide rail in the event of an impact.

In various embodiments, the invention may advantageously have one and/or the other of the following arrangements:

the lock has at least two degrees of freedom between its unlocked position and its locked position, apart from translation in the longitudinal direction, relative to the second profile;

the lock is movably mounted in translation along the transversal direction and in rotation about a rotational axis parallel to the longitudinal direction;

the lock is mobile in rotation about an upper unlocking axis relative to the second profile, between the locked position and an intermediate position, the upper unlocking axis extending in the longitudinal direction and passing through the contact of the first stop surface of the first series of teeth with the first abutment surface of the first profile and through the contact of the second stop surface of the first series of teeth with the second abutment surface of the first profile;

the lock has a bearing portion which comes into contact with a bearing surface of the second profile in the intermediate position;

the bearing portion of the lock slides along the bearing surface of the second profile, along the transversal direction between the intermediate position and the unlocked position;

the lock is mobile in rotation about a lower unlocking axis relative to the second profile, between the intermediate position and the unlocked position, the lower unlocking axis extending in the longitudinal direction and passing through the contact between the bearing portion of the lock and the bearing surface of the second profile;

perpendicular to the longitudinal direction, the lock has a U-shaped section, comprising a first branch including the first series of teeth, a second branch including the second series of teeth and a base portion connecting the first branch and the second branch;

the slide rail further comprises a spring biasing the second branch in the upright direction and upwards to bring the first stop surface and the second stop surface of the second series of teeth respectively into contact with the first abutment surface and the second abutment surface of the second profile;

the slide rail further comprises a spring biasing the base portion to bring the first stop surface and the second stop surface of the first series of teeth respectively into contact with the first abutment surface and the second abutment surface of the first profile.

The invention further relates to an assembly comprising, apart from the aforementioned slide rail, a control device movably mounted on the second profile to bring the lock into its unlocked position, in which the control device comes into contact with the second branch of the lock.

BRIEF DESCRIPTION OF THE DRAWINGS

Further features and advantages of the present invention will emerge from the following detailed description, with reference to the accompanying drawings in which.

DETAILED DESCRIPTION OF THE DISCLOSURE

Figure 1:
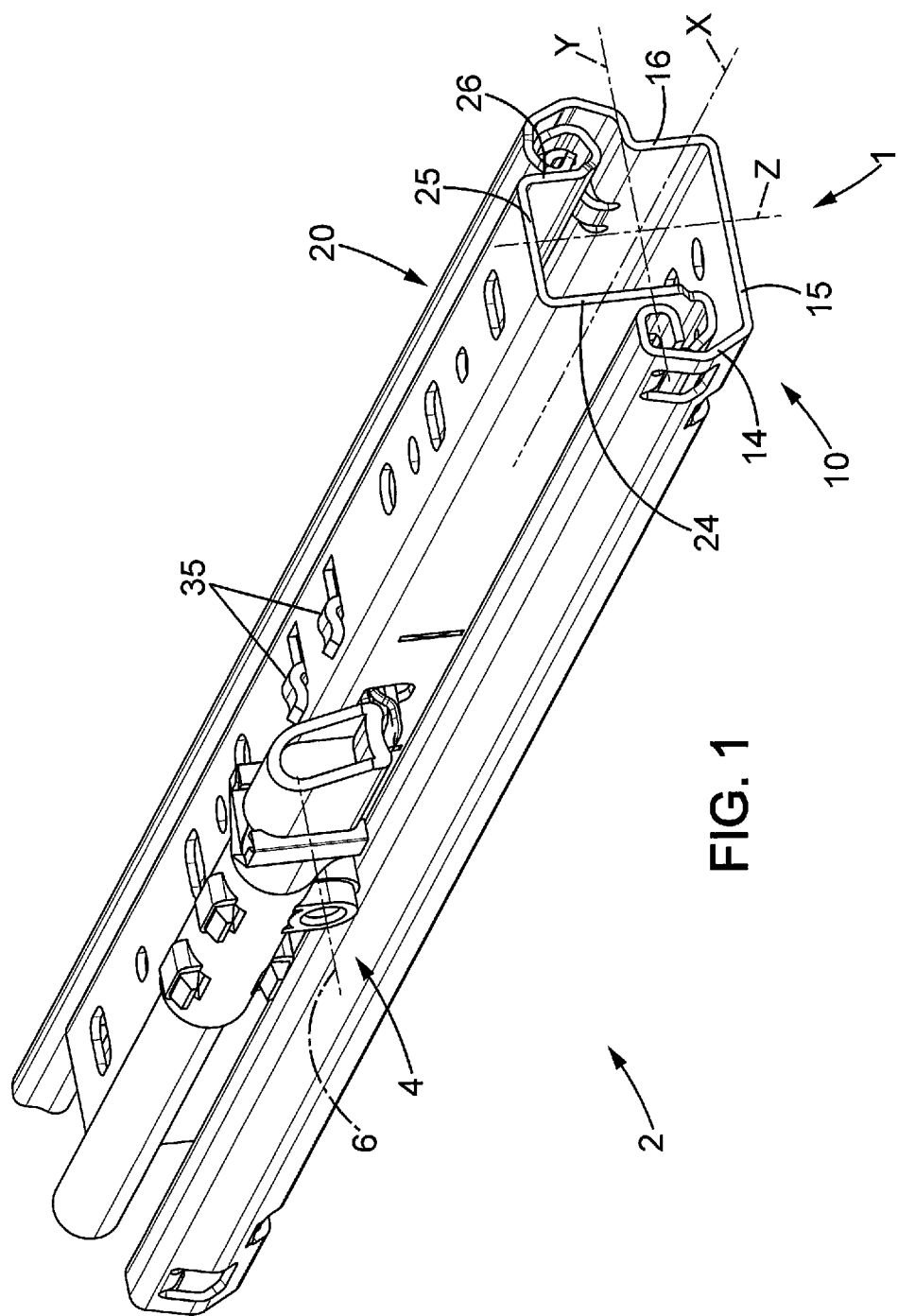
FIG. 1 illustrates, in perspective, an assembly according to the invention, according to a first embodiment.

FIGS. 1 to 7 illustrate an assembly 2 for longitudinal adjustment of an automotive vehicle seat comprising two slide rails 1 (only one being shown) arranged symmetrically and a control bar 4.

The slide rail essentially comprises a lower profile 10, an upper profile 20 and a lock 30. The lower profile 10 and the upper profile 20 form two rails extending in a longitudinal direction X designed to be respectively fixed to a vehicle floor and to an automotive vehicle seat pan.

Figure 2:
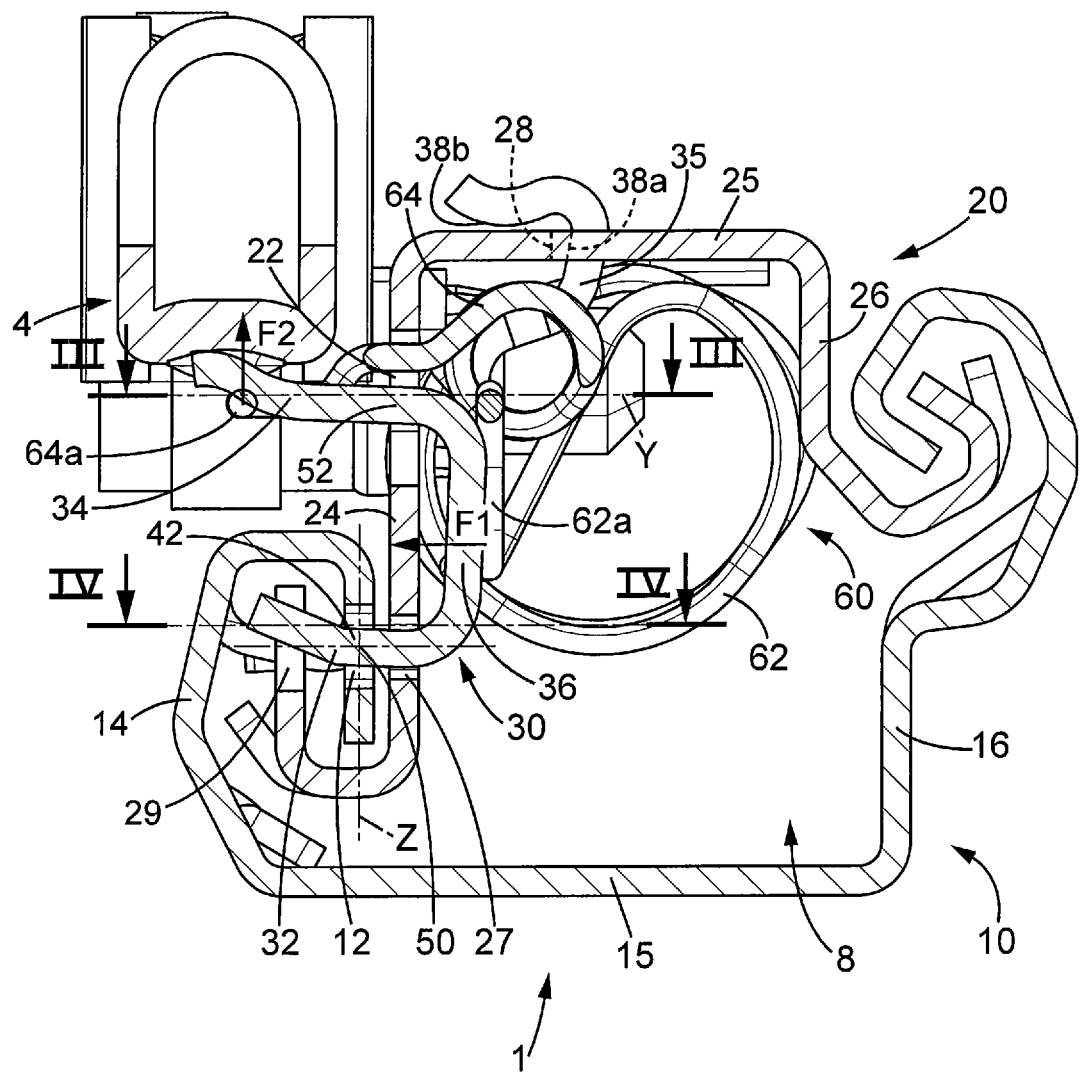
FIG. 2 illustrates the assembly according to the first embodiment, in section along the line referenced II-II in FIG. 3, in the locked position.

As illustrated in particular in FIG. 2, perpendicular to the longitudinal direction X, the lower profile 10 is substantially U-shaped in section, comprising an internal branch 14, an external branch 16 and a base portion 15 connecting the internal branch 14 to the external branch 16. The internal branch 14 is shorter than the external branch 16. The base portion 15 extends in a transversal direction Y perpendicular to the longitudinal direction X, whilst the internal branch 14 and the external branch 16 generally extend in an upright direction Z, perpendicular to the longitudinal direction X and to the transversal direction Y.

The internal branch 14 comprises apertures 12 uniformly distributed in the longitudinal direction X. The apertures 12 are all of the same size. They are defined in the longitudinal direction X by a first abutment surface 11 and a second abutment surface 13.

Perpendicular to the longitudinal direction X, the upper profile 20 is substantially U-shaped in section, comprising an internal branch 24, an external branch 26 and a base portion 25 connecting the internal branch 24 to the external branch 26. The base portion 25 extends in the transversal direction Y, whilst the internal branch 24 and the external branch 26 generally extend in the upright direction Z. The internal branch 24 is longer than the external branch 26. However, as a variant, the internal branch 24 and the external branch 26 of the upper profile 20 could be of the same length, the upper profile 20 (and the lower profile) thus preferably being symmetrical, with the two running surfaces at the same level in the upright direction Z.

The internal branch 24 of the upper profile 20 has an aperture 22 defined in the longitudinal direction X by a first abutment surface 21 and a second abutment surface 23.

The lower U-shaped profile 10 and the upper U-shaped profile 20 are open towards one another with the internal branch 14 of the lower profile 10 opposite the internal branch 24 of the upper profile 20 and the external branch 16 of the lower profile 10 opposite the external branch 26 of the upper profile 20, such that the lower profile 10 and the upper profile 20 define relative to one another a cavity 8 in which the lock 30 is received.

Figure 5:
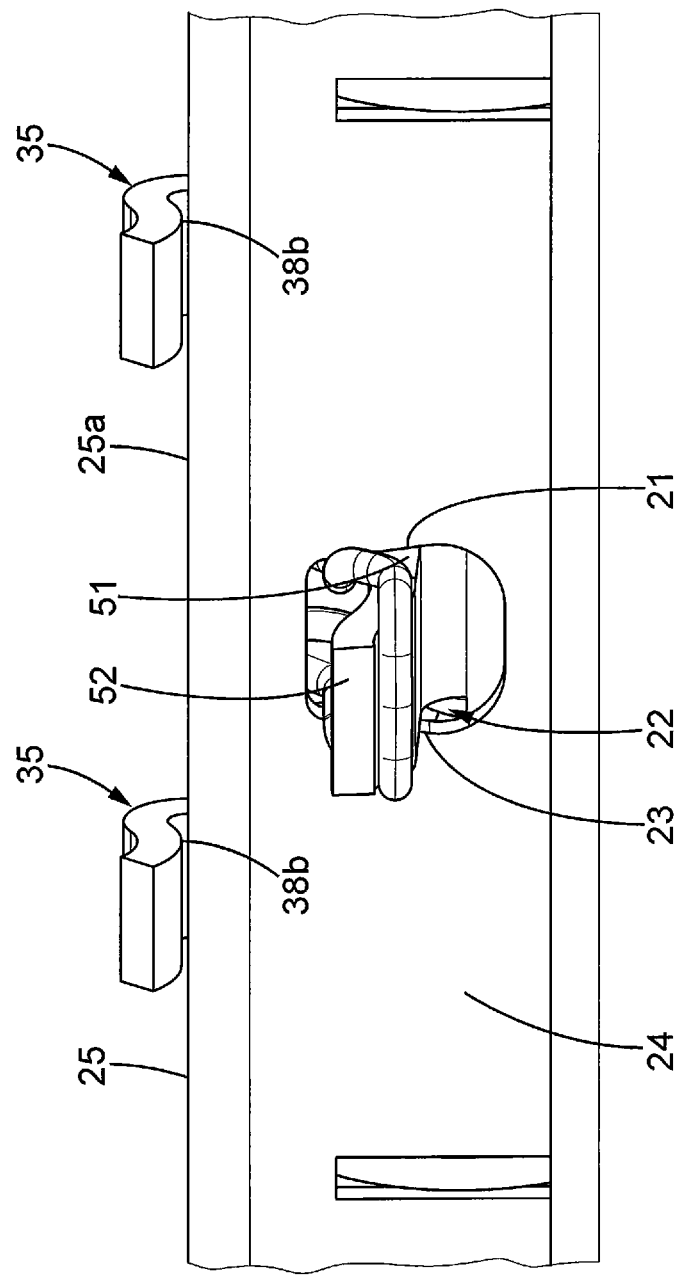
FIG. 5 is a partial view in perspective along the arrow referenced V in FIG. 3, at enlarged scale, of the assembly according to the first embodiment, in the locked position.

As illustrated in particular in FIG. 5, the first abutment surface 21 and the second abutment surface 23 of the upper profile 20 each form a slight angle (approximately 5 degrees) relative to the upright direction Z, this angle being in opposing directions for the first abutment surface 21 and the second abutment surface 23. The first abutment surface 21 and the second abutment surface 23 of the upper profile 20 converge towards one another upwards in the upright direction Z.

The internal branch 24 of the upper profile 20 further comprises a through-passage 27 and notches 29, in this case four in number. As a variant, the upper profile 20 could comprise a plurality of separate through-passages 27 spaced apart in the longitudinal direction X.

The lock 30 has a U-shaped section, perpendicular to the longitudinal direction X, comprising a lower branch 32, an upper branch 34 and a base portion 36 connecting the lower branch 32 and the upper branch 34. The lower branch 32 and the upper branch 34 generally extend in the transversal direction Y, whilst the base portion 36 extends substantially in the upright direction Z.

The lower branch 32 comprises a first lower stop tooth 42 having a first lower stop surface 41, a second lower stop tooth 44 having a second lower stop surface 43. Depending on the load, the lower branch 32 may also comprise two (as shown), or more, lower security teeth 46. The first lower stop tooth 42, the second lower stop tooth 44 and the lower security teeth 46 each extend substantially in the transversal direction Y.

Figure 4:
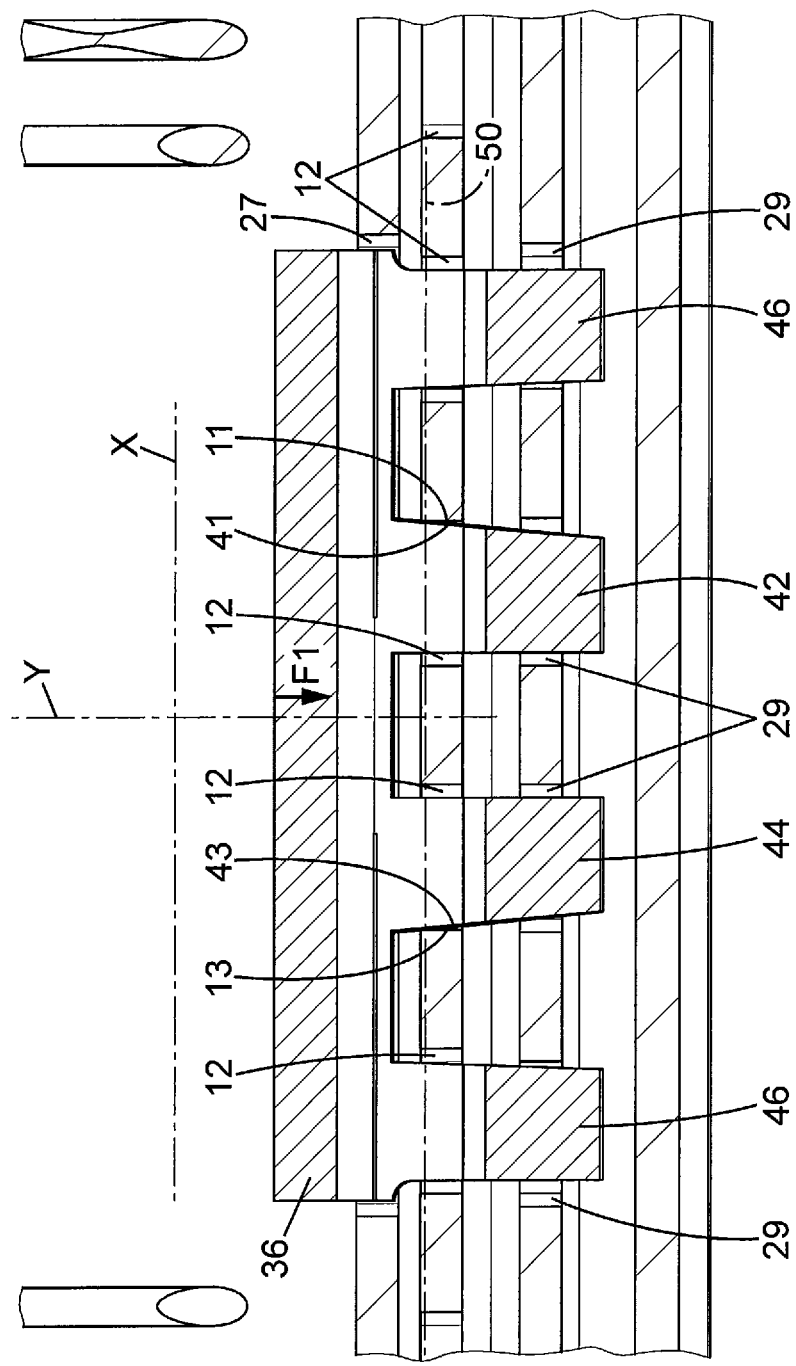
FIG. 4 illustrates the assembly according to the first embodiment, in section along the line referenced IV-IV in FIG. 2, in the locked position.

As illustrated in particular in FIG. 4, the first lower stop tooth 42 and the second lower stop tooth 44 are slightly bevelled, the first lower stop surface 41 and the second lower stop surface 43 forming a slight angle (approximately 5 degrees) relative to the transversal direction Y, this angle being in opposing directions for the first lower stop surface 41 and the second lower stop surface 43.

Figure 3:
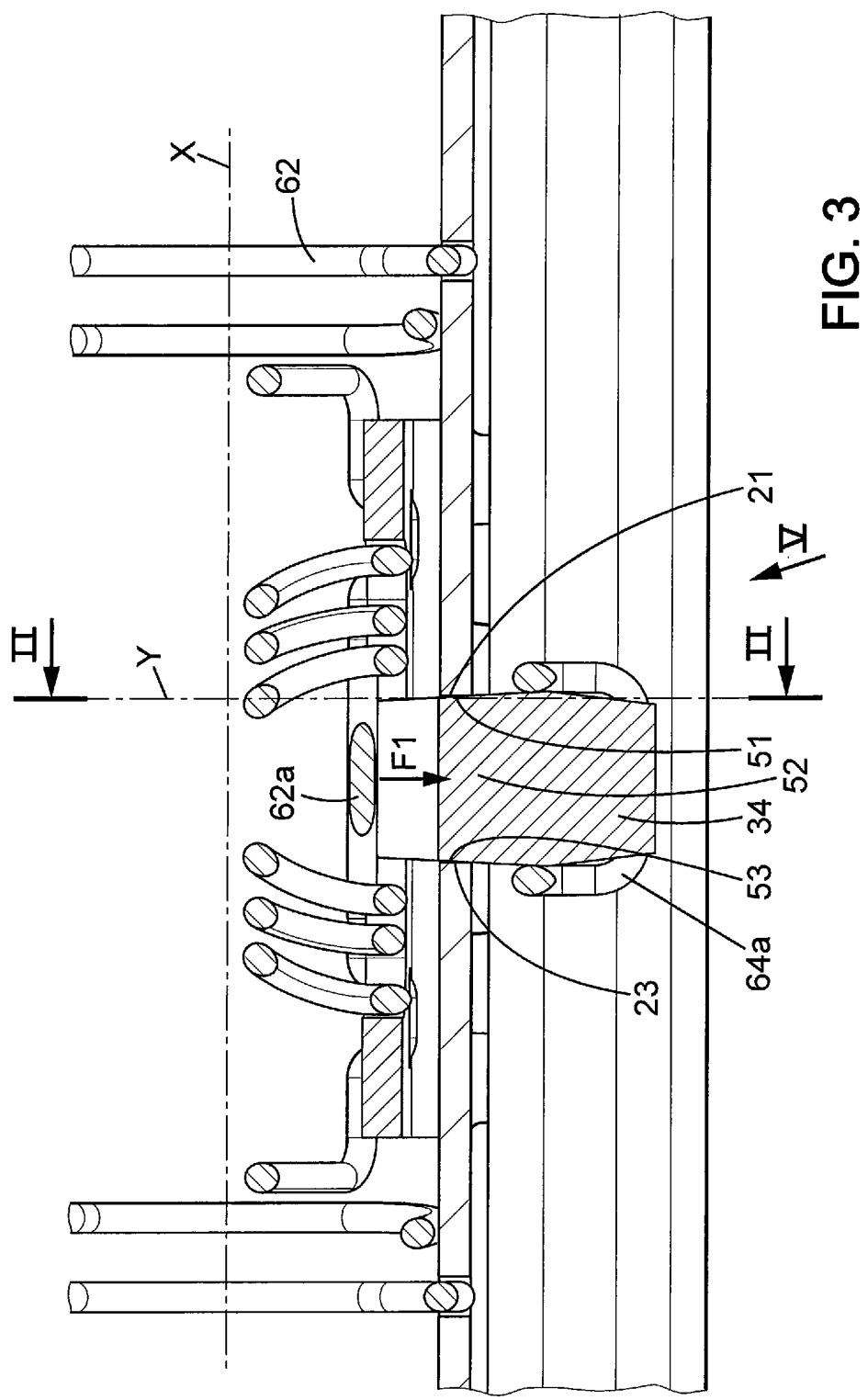
FIG. 3 illustrates the assembly according to the first embodiment, in section along the line referenced in FIG. 2, in the locked position.

As illustrated in particular in FIG. 3, the upper branch 34 comprises an upper stop tooth 52 defined in the longitudinal direction X by a first upper stop surface 51 and a second upper stop surface 53. The upper stop tooth 52 is slightly bevelled, the first upper stop surface 51 and the second upper stop surface 53 each forming a slight angle (approximately 5 degrees) relative to the transversal direction Y, this angle being in opposing directions for the first upper stop surface 51 and the second upper stop surface 53.

The lock 30 also comprises two arms 35 extending in the extension of the base portion 36 above the upper branch 34. These arms 35 pass through an opening made in the base portion 36 and have a first bearing portion 38a designed to bear against the edge 28 of said opening and a second bearing portion 38b designed to bear against the top of the base portion 25 of the upper profile 20.

As illustrated in FIGS. 2 to 4, the slide rail 1 further comprises a first spring 62 and a second spring 64. In the illustrated embodiment, the first spring 62 and the second spring 64 are separate. As a variant, the first spring 62 and the second spring 64 could be combined into a single element.

The first spring 62 has an arm 62a bearing against the base portion 36 of the lock 30. The first spring 62 exerts on the base portion 36 of the lock 30 a force F1 in the transversal direction Y, towards the inside of the assembly 2, bringing the first lower stop surface 41 of the lock 30 into contact with the first abutment surface 11 of the lower profile 10 and the second lower stop surface 43 of the lock 30 into contact with the second abutment surface 13 of the lower profile 10, as illustrated in particular in FIG. 4. The lock 30 is thus biased by the first spring 62 into a locked position in which the lock 30 is held without clearance relative to the lower profile 10 in the longitudinal direction X.

The second spring 64 has an arm 64a bearing against the upper branch 34 of the lock 30, on which the second spring 64 exerts a force F2 in the upright direction Z upwards, bringing the first upper stop surface 51 and the second upper stop surface 53 of the lock 30 into contact, respectively with the first abutment surface 21 and the second abutment surface 23 of the upper profile 20, as illustrated in particular in FIGS. 3 and 5. The lock 30 is thus biased by the second spring 64 into the locked position, in which the lock 30 is again held without clearance relative to the upper profile 20 in the longitudinal direction X.

Thus, the lock 30 is mounted mobile in rotation about the longitudinal direction X and in translation in the transversal direction Y relative to the lower profile and the upper profile 20. The first spring 62 biases the lock 30 in order to hold it in the transversal direction Y, by contact between the first lower stop surface 41 and the second lower stop surface 43 of the lock 30, respectively with the first abutment surface 11 and the second abutment surface 13 of the lower profile 10, whilst the second spring 64 biases the lock 30 in order to hold it in rotation about the longitudinal direction X, by contact between the first upper stop surface 51 and the second upper stop surface 53 of the lock 30, respectively with the first abutment surface 21 and the second abutment surface 23 of the upper profile 20.

It should be noted that the teeth 42, 44, 46 of the lower branch 32 of the lock 30 are not in contact with the upper profile 20, at least in the longitudinal direction X, since they pass with clearance through the through-passage 27 and the notches 29. Moreover, the upper stop tooth 52 and more generally the upper branch 34 of the lock 30 are located at a distance from the lower profile 10.

Figure 6:
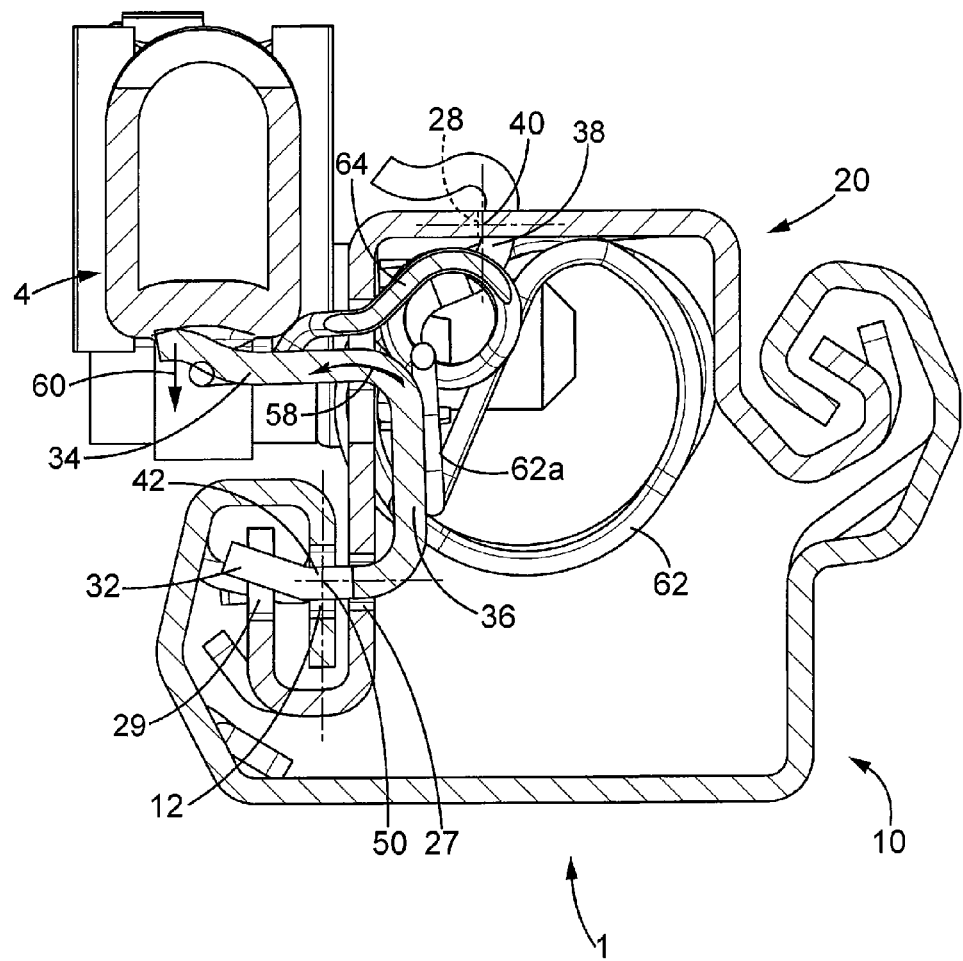
FIG. 6 illustrates the assembly according to the first embodiment, in section along the line referenced II-II in FIG. 3, in the intermediate position.

The control bar 4 is mounted movably in rotation about a control axis 6 parallel to the transversal direction Y. As illustrated in FIG. 6 by the arrow 60, when the user acts on the control bar 4, the end of the control bar 4 is displaced in the upright direction Z and bears against the upper branch 34 of the lock 30 which serves as an unlocking catch. The lock 30 pivots, therefore, about an upper unlocking axis 50 between the locked position and an intermediate position, as illustrated by the arrow 58.

As illustrated in FIG. 4, the upper unlocking axis 50 is defined by the contact of the first stop surface 41 of the first lower stop tooth 42 with the first abutment surface 11 of the lower profile 10 and by the contact of the second stop surface 43 of the second lower stop tooth 44 with the second abutment surface 13 of the lower profile 10. The upper unlocking axis 50 extends in the longitudinal direction X.

A lever arm is thus available to the user for separating, on the one hand, the first upper stop surface 51 of the lock 30 from the first abutment surface 21 of the upper profile 20 and, on the other hand, the second upper stop surface 53 of the lock 30 from the second abutment surface 23 of the upper profile 20 which tend to remain locked together.

The lock 30, therefore, has clearance in the longitudinal direction X relative to the upper profile 20 but is always held without clearance relative to the lower profile 10 in the longitudinal direction X. More specifically, the point contact of the first stop surface 41 of the first lower stop tooth 42 with the first abutment surface 11 of the lower profile 10 and the point contact of the second stop surface 43 of the second lower stop tooth 44 with the second abutment surface 13 of the lower profile 10 are still present.

In the intermediate position, the first bearing portion 38a of the lock 30 comes into contact with the bearing surface 28 of the upper profile 20.

Figure 7:
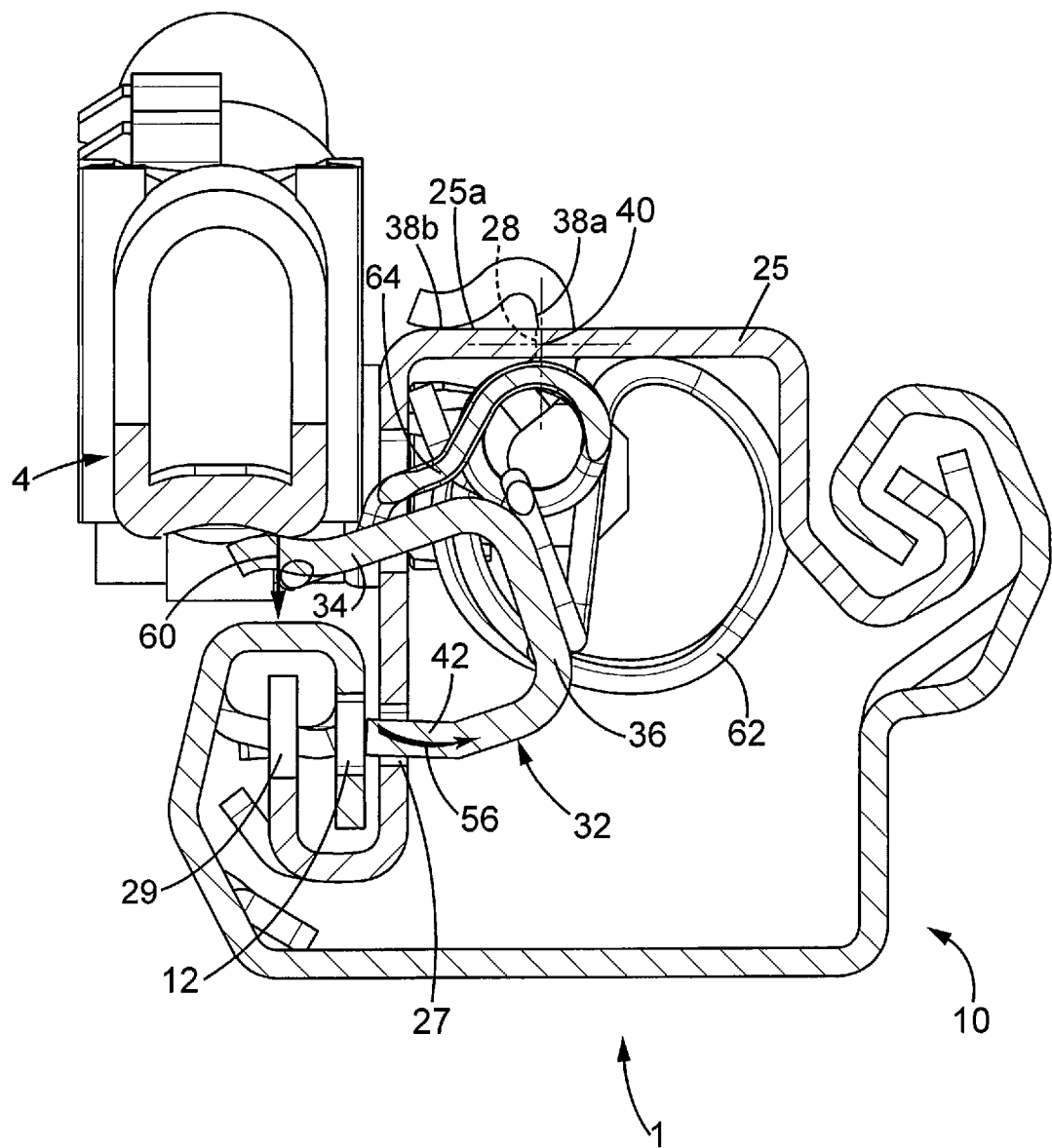
FIG. 7 illustrates the assembly according to the first embodiment, in section along the line referenced II-II in FIG. 3, in the unlocked position.
Figure 8:
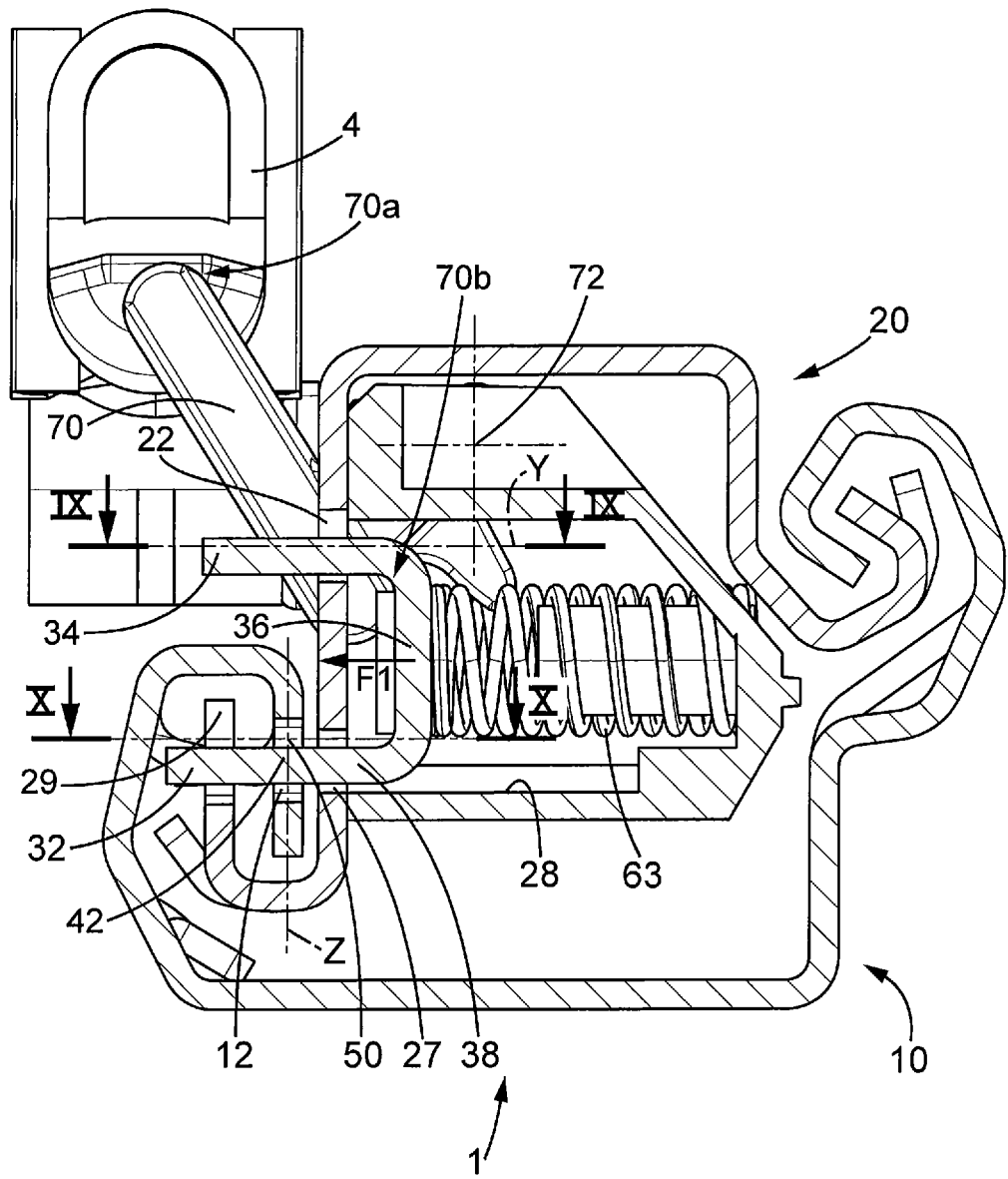
FIG. 8 illustrates the assembly according to a second embodiment, in section along the line referenced VIII-VIII in FIG. 9, in the locked position.
Figure 9:
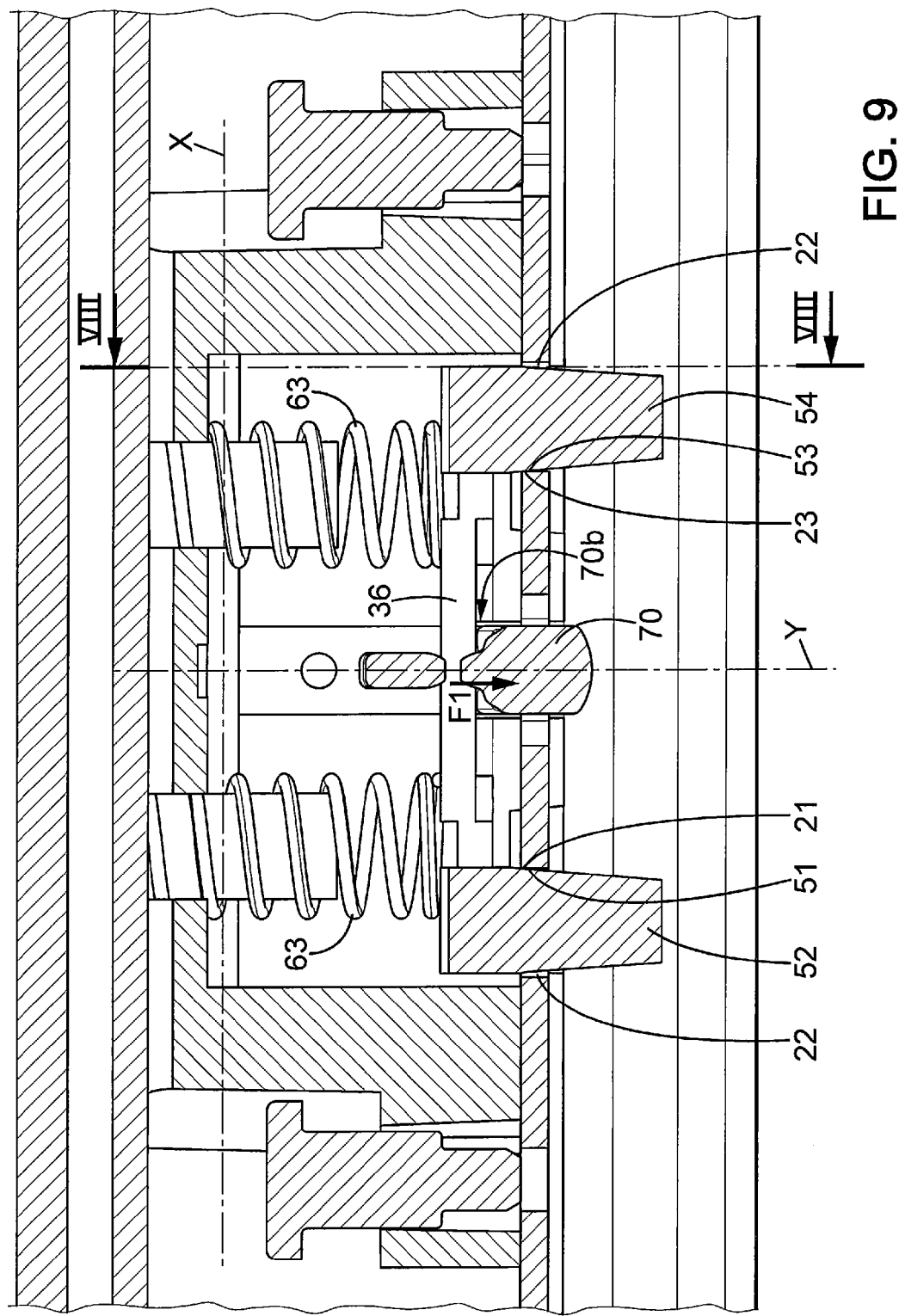
FIG. 9 illustrates the assembly according to the second embodiment, in section along the line referenced IX-IX in FIG. 8, in the locked position.
Figure 10:
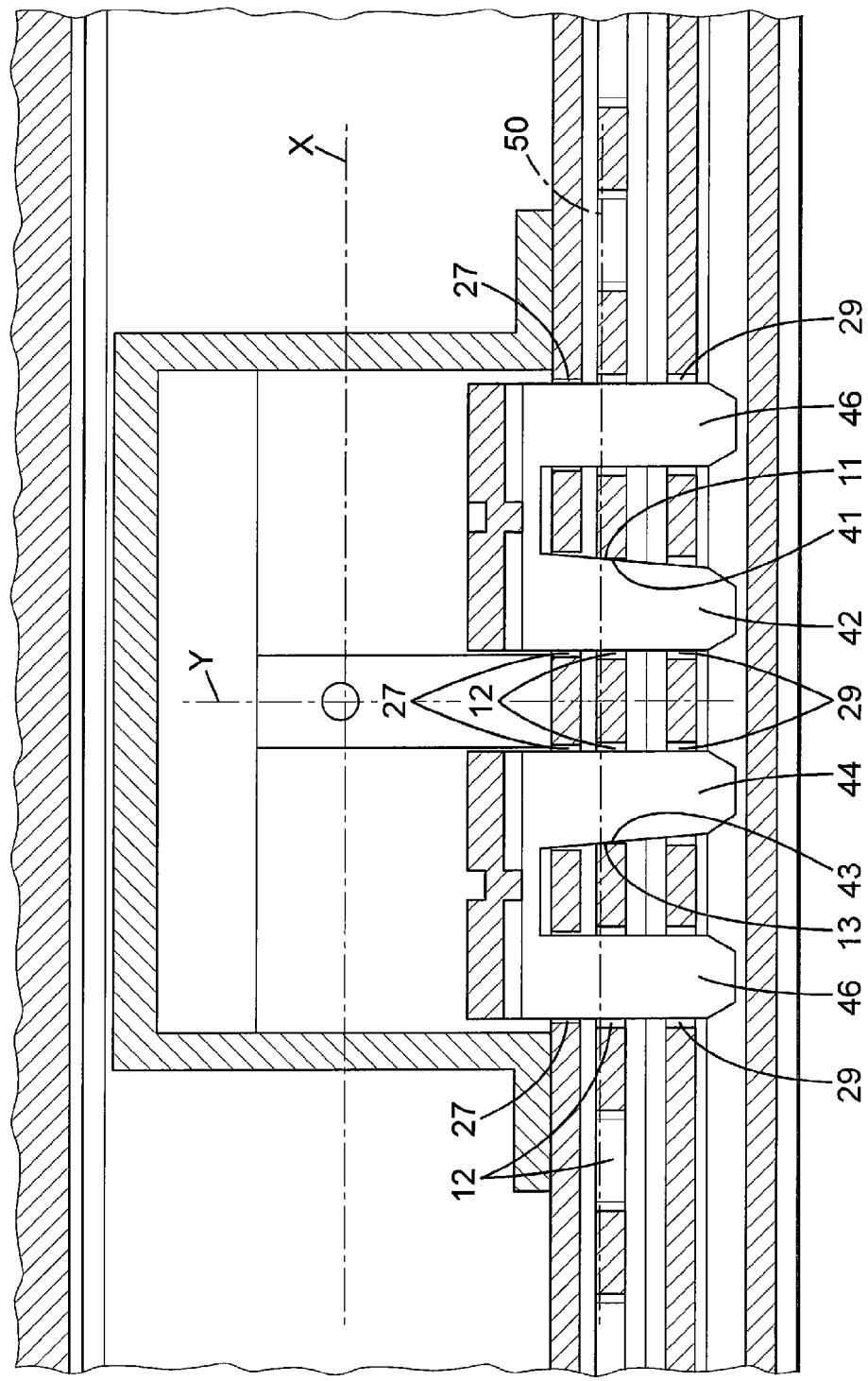
FIG. 10 illustrates the assembly according to the second embodiment, in section along the line referenced X-X in FIG. 8, in the locked position.

Continuing to act on the bar 4, the user continues to pivot the bar 4 about the control axis 6 as illustrated by the arrow 60 of FIG. 7. The lock 30 thus pivots about a lower unlocking axis 40 as far as an unlocked position, as illustrated by the arrow 56 in FIG. 7. The lower unlocking axis 40 extends in the longitudinal direction X and passes through the line of contact between the first bearing portion 38a of the arms 35 of the lock 30 and the bearing surfaces 28 of the upper profile 20.

A large lever arm is thus available to the user to separate, on the one hand, the first lower stop surface 41 of the lock 30 from the first abutment surface 11 of the lower profile 10 and, on the other hand, the second lower stop surface 43 of the lock 30 from the abutment surface 13 of the lower profile 10 which tend to remain locked together.

It should be noted that during its displacement between the intermediate position and the unlocked position, the lock 30 also preferably comes to bear with its second bearing portion 38b against an external surface 25a of the base portion 25 of the upper profile 20, in order to provide the teeth 42, 44, 46 of the lower branch 32 of the lock 30 with almost zero displacement in the upright direction Z.

In the unlocked position, the teeth 42, 44, 46 of the lower branch 32 of the lock 30 are at a distance from the apertures 12 of the lower profile 10.

FIGS. 8 to 12 illustrate a second embodiment. The second embodiment is differentiated from the first embodiment in that the lock 30 has no arms and is thus limited to the lower branch 32, the upper branch 34 and the base portion 36, in that the slide rail 1 further comprises a bearing surface 28 fixed to the upper profile 20, extending perpendicular to the upright direction Z and opposite the lower branch 32 of the lock 30, in that the springs 63 are each formed by a compression spring bearing solely against the base portion 36 of the lock 30 and exerting a force F1 on the base portion 36 in the transversal direction Y, in that the slide rail 1 further comprises a lever 70 mounted pivotably about a rotational axis 72 parallel to the longitudinal direction X and in that the upper branch 34 of the lock 30 comprises a first upper stop tooth 52 comprising the first abutment surface 21 and a second upper stop tooth 54 comprising the second abutment surface 23.

The lever 70 comprises a first end 70a on which the control device 4 acts and a second end 70b acting on the base portion 36 of the lock 30.

Figure 11:
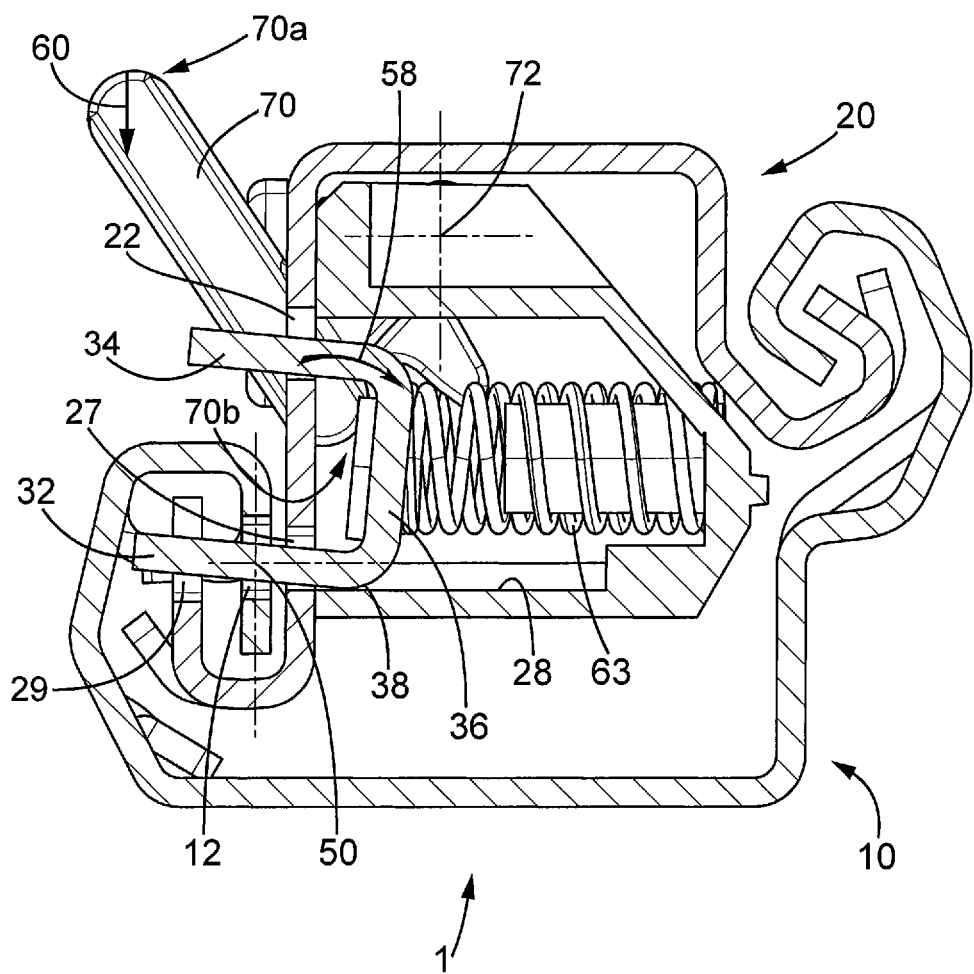
FIG. 11 illustrates the assembly according to the second embodiment, in section along the line referenced VIII-VIII in FIG. 9, in the intermediate position.

When the user acts on the control bar 4 as illustrated by the arrow 60 in FIG. 11, the end of the control bar 4 is displaced in the upright direction Z and pivots the lever 70 about the rotational axis 72. The lock 30 then pivots about the upper unlocking axis 50 between the locked position and the intermediate position, as illustrated by the arrow 58 in FIG. 11.

Thus, by means of the lever 70, a lever arm is always available to the user to separate the first 51 and the second 53 upper stop surfaces of the lock 30 respectively from the first 21 and the second 23 abutment surfaces of the upper profile 20.

In the intermediate position, the end 70b of the lock 70 has released the upper stop tooth 52 which then has clearance relative to the upper profile 20 and, in particular, relative to the aperture 22. Moreover, the bearing portion 38 formed by the lower surface of the first branch 32 of the lock 30 comes into contact with the bearing surface 28.

The lock 30 then has clearance in the longitudinal direction X relative to the upper profile 20 but is still held without clearance relative to the lower profile 10 in the longitudinal direction X.

Figure 12:
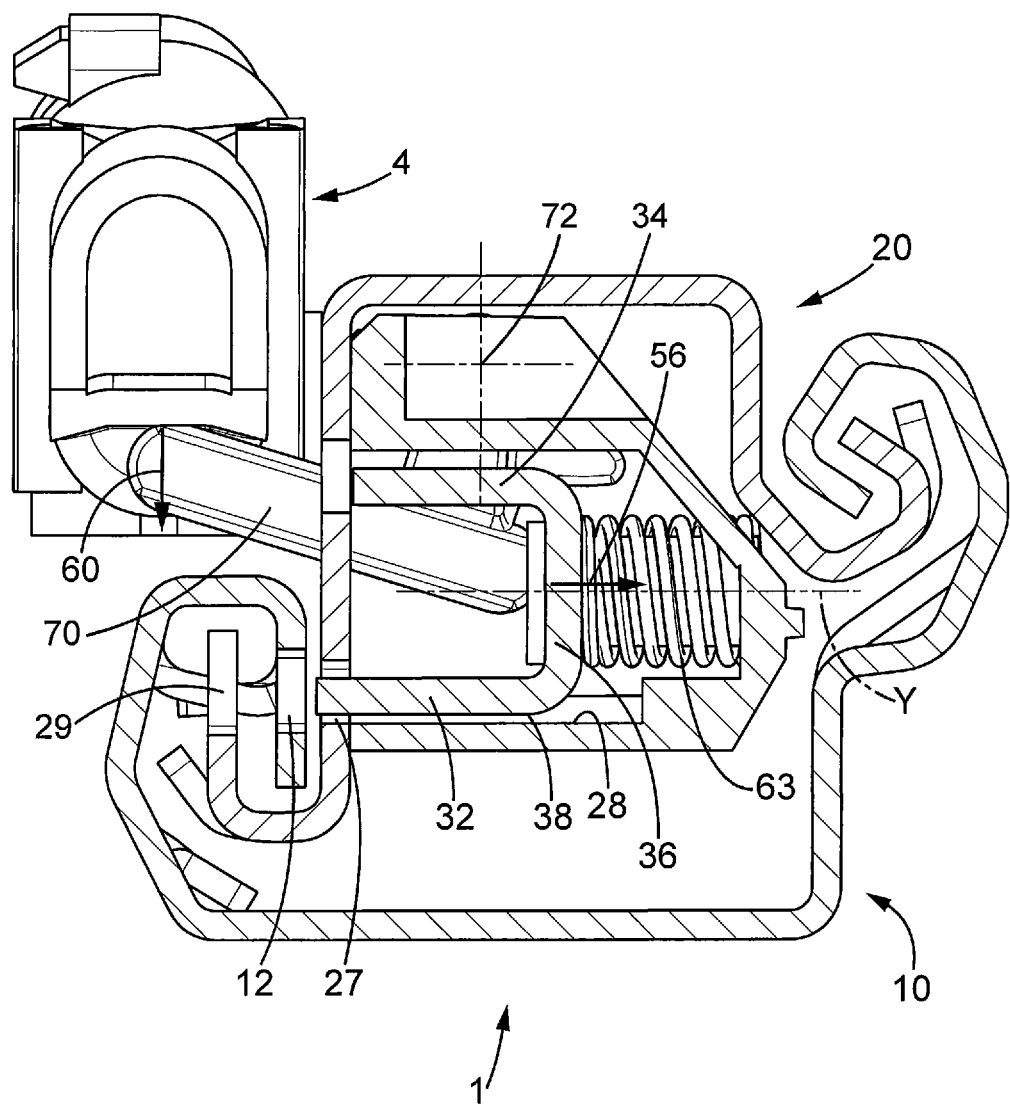
FIG. 12 illustrates the assembly according to the second embodiment, in section along the line referenced VIII-VIII in FIG. 9, in the unlocked position.

By continuing to act on the bar 4, the user continues to pivot the bar 4 about the control axis 6, as illustrated by the arrow 60 in FIG. 12. The lever 70 continues to pivot about the rotational axis 72 and to apply a force on the base portion 36 of the lock 30. The lock 30 then slides in the transversal direction Y, the bearing portion 38 of the lock 30 coming substantially into contact with the bearing surface 28 which guides the bearing portion 38 of the lock 30 as far as an unlocked position, as illustrated by the arrow 56 in FIG. 12.

As a variant, however, the bearing surface 28 could be omitted. As the point of contact between the second end 70b of the lever 70 and the lock 30 is displaced towards the first branch 32 of the lock 30 during the pivoting of the lever 70 about the rotational axis 72, the lever 70 may be sufficient to free the lower stop teeth 42, 44 from the lower profile 10, after having released the upper stop tooth 52 from the upper profile 20.

Of course, the invention is not limited in any way to the embodiments illustrated. Thus, in the two embodiments, the first and second upper stop surfaces may be arranged in different ways, either on the same tooth or on different teeth, the most important point being that they act in opposing directions to immobilize the lock relative to the upper profile.

The invention claimed is:

1. Slide rail for an automotive vehicle seat comprising a first profile, a second profile and a lock, in which:
    the lock is movably mounted on the second profile between an unlocked position and a locked position, in the unlocked position the lock permitting a relative sliding between the first profile and the second profile along a longitudinal direction, and in the locked position the lock (30) preventing said relative sliding,
    the lock has a first series of teeth and a second series of teeth, the teeth of the first series and the second series each extending in a transversal direction perpendicular to the longitudinal direction, and the first series of teeth is remote from the second series of teeth in an upright direction perpendicular to the longitudinal direction and the transversal direction, and wherein:
    the first series of teeth has a first stop surface and a second stop surface opposing one another, respectively coming into contact with a first abutment surface and a second abutment surface of the first profile, in the locked position, to immobilize the lock in translation relative to the first profile along the longitudinal direction,
    the second series of teeth has a first stop surface and a second stop surface, opposing one another, respectively coming into contact with and abutting against a first abutment surface and a second abutment surface of the second profile along the longitudinal direction and the second series of teeth are held without clearance relative to the second profile in the longitudinal direction, in the locked position, to immobilize by the abutment the lock in translation relative to the second profile in the longitudinal direction, and wherein the second series of teeth has clearance relative to the second profile in the longitudinal direction in the unlocked position.

2. Slide rail according to claim 1, wherein the lock has at least two degrees of freedom between its unlocked position and its locked position, apart from the translation in the longitudinal direction relative to the second profile.

3. Slide rail according to claim 1, wherein the lock is movably mounted in translation along the transversal direction and in rotation about a rotational axis parallel to the longitudinal direction.

4. Slide rail according to claim 1, wherein the lock is mobile in rotation about an upper unlocking axis relative to the second profile, between the locked position and an intermediate position, the upper unlocking axis extending in the longitudinal direction and passing through the contact of the first stop surface of the first series of teeth with the first abutment surface of the first profile and through the contact of the second stop surface of the first series of teeth with the second abutment surface of the first profile.

5. Slide rail according to claim 4, wherein the lock has a bearing portion which comes into contact with a bearing surface of the second profile in the intermediate position.

6. Slide rail according to claim 5, wherein the bearing portion of the lock slides along the bearing surface of the second profile, along the transversal direction between the intermediate position and the unlocked position.

7. Slide rail according to claim 5, wherein the lock is mobile in rotation about a lower unlocking axis relative to the second profile, between the intermediate position and the unlocked position, the lower unlocking axis extending in the longitudinal direction and passing through the contact between the bearing portion of the lock and the bearing surface of the second profile.

8. Slide rail according to claim 1, wherein perpendicular to the longitudinal direction the lock has a U-shaped section, comprising a first branch including the first series of teeth, a second branch including the second series of teeth and a base portion connecting the first branch and the second branch.

9. Slide rail according to claim 8, further comprising a spring biasing the second branch in the upright direction and upwards to bring the first stop surface and the second stop surface of the second series of teeth respectively into contact with the first abutment surface and the second abutment surface of the second profile.

10. Slide rail according to claim 9, further comprising a spring biasing the base portion to bring the first stop surface and the second stop surface of the first series of teeth respectively into contact with the first abutment surface and the second abutment surface of the first profile.

11. Assembly for an automotive vehicle seat comprising a slide rail and a control device, in which
    the slide rail comprises a first profile, a second profile and a lock,
    the lock is movably mounted on the second profile between an unlocked position and a locked position, in the unlocked position the lock permitting a relative sliding between the first profile and the second profile along a longitudinal direction, and in the locked position the lock preventing said relative sliding,
    the lock has a first series of teeth and a second series of teeth, the teeth of the first series and the second series each extending in a transversal direction perpendicular to the longitudinal direction, and the first series of teeth is remote from the second series of teeth in an upright direction perpendicular to the longitudinal direction and the transversal direction, the control device is movably mounted on the second profile to bring the lock into its unlocked position,
wherein:
the first series of teeth has a first stop surface and a second stop surface opposing one another, respectively coming into contact with a first abutment surface and a second abutment surface of the first profile, in the locked position, to immobilize the lock in translation relative to the first profile along the longitudinal direction,
the second series of teeth has a first stop surface and a second stop surface, opposing one another, respectively coming into contact with and abutting against a first abutment surface and a second abutment surface of the second profile along the longitudinal direction and the second series of teeth are held without clearance relative to the second profile in the longitudinal direction, in the locked position, to immobilize by the abutment the lock in translation relative to the second profile in the longitudinal direction, and wherein the second series of teeth has clearance relative to the second profile in the longitudinal direction in the unlocked position,
perpendicular to the longitudinal direction the lock has a U-shaped section, comprising a first branch including the first series of teeth, a second branch including the second series of teeth and a base portion connecting the first branch and the second branch, and
the control device comes into contact with the second branch of the lock.

12. Assembly according to claim 11, wherein the second profile has an aperture defined in the longitudinal direction by the first abutment surface and the second abutment surface of the second profile.

13. Slide rail according to claim 1, wherein the second profile has an aperture defined in the longitudinal direction by the first abutment surface and the second abutment surface of the second profile.

* * * * *